United States Patent [19]

Solhjell

[11] Patent Number: 4,809,092
[45] Date of Patent: Feb. 28, 1989

[54] IMPROVED METHOD AND ARRANGEMENT FOR RECORDING DIGITAL DATA ON A MAGNETIC RECORDING MEDIUM BY USE OF BINARY DATA SIGNALS AND MAGNETIC BIAS SIGNALS

[75] Inventor: Erik Solhjell, Konvallveien, Norway

[73] Assignee: Tandberg Data A/S, Oslo, Norway

[21] Appl. No.: 70,199

[22] Filed: Jul. 6, 1987

[30] Foreign Application Priority Data

Sep. 30, 1986 [DE] Fed. Rep. of Germany ....... 3633269

[51] Int. Cl.⁴ ............................................. G11B 5/09
[52] U.S. Cl. ....................... 360/66; 360/51; 360/40; 360/41
[58] Field of Search ............ 360/66, 46, 51, 68, 360/40, 41

[56] References Cited

U.S. PATENT DOCUMENTS 4,202,017 5/1980 Geffon et al. .
4,367,496 1/1983 Lesieur .................................. 360/51
4,420,776 12/1983 Jove et al. ............................ 360/51
4,547,818 10/1985 Lia .

FOREIGN PATENT DOCUMENTS 0080575 6/1963 European Pat. Off. .
2054242A 2/1981 United Kingdom .
2055238A 2/1981 United Kingdom .

Primary Examiner—Raymond F. Cardillo
Assistant Examiner—Kevin Fournier

[57] ABSTRACT

For recording digital data on a magnetic recording medium, binary data signals and magnetic bias signals having a constant repetition rate are synchronized in terms of phase, are overlaid, and are subsequently supplied to a magnetic head. The phase-oriented synchronization thus occurs since the chronological spacings between two successive signal edges of the magnetic bias signals between two successive signal edges of the data signals given a plurality of magnetic bias signals are modified such that the directions of the signal edges of the data signals coincide with the directions of the corresponding signal edges of the magnetic bias signals. The sums of the components having a first binary value and a second binary value of the magnetic bias signals are identical. Preferably, the distances between two successive signal edges of each of two magnetic bias signals are respectively shortened by half between two edges of a data signal.

16 Claims, 3 Drawing Sheets

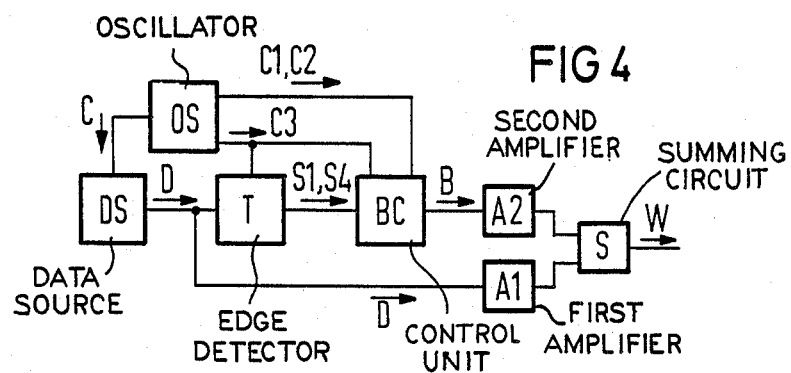
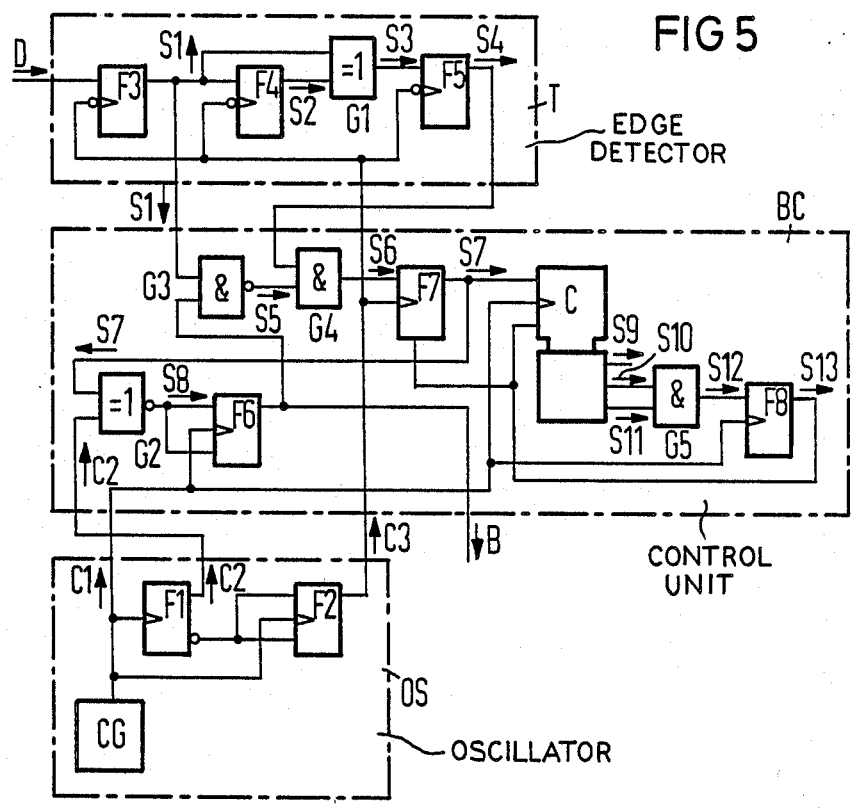

IMPROVED METHOD AND ARRANGEMENT FOR RECORDING DIGITAL DATA ON A MAGNETIC RECORDING MEDIUM BY USE OF BINARY DATA SIGNALS AND MAGNETIC BIAS SIGNALS

BACKGROUND OF THE INVENTION

1. Field of the Invention

The invention is directed to a method for recording digital data on a magnetic recording medium by use of binary data signals which represent the digital data and magnetic bias signals whose period durations are significantly shorter than a shortest period duration of the data signals. The magnetic bias signals and the data signals are synchronized so that signal edges of the data signals occur simultaneously with signal edges of the magnetic bias signals.

2. Description of the Prior Art:

It is already generally known to employ high-frequency magnetic bias signals when recording digital data on a magnetic recording medium such as, for example, a magnetic disc or a magnetic tape. These magnetic bias signals are overlaid on the data signals and are synchronized with these data signals such that the signal edges of the data signals occur simultaneously with the signal edges of the magnetic bias signals.

In a method disclosed by German published application No. 32 33 489, the direction of the signal edges of the data signals are either the same as, or opposite, the direction of the simultaneously occurring magnetic bias signals. When a signal edge of a data signal is in-phase with the signal edge of a corresponding magnetic bias signal, only a slight shift of the signal edges may occur upon playback of the recorded signal, i.e. the deviation of the occurrence of this signal edge from an anticipated occurrence or point in time is slight. When, however, the signal edge of the magnetic bias signal has an opposite phase, a considerable offset of the signal edge of the recorded signal can occur when the data signals at both sides of the signal edge are allocated to unequal data sequences.

It is disclosed by U.S. Pat. No. 4,420,776, incorporated herein by reference, to generate the magnetic bias signals phase-locked with the data signals and to modify the frequencies of the magnetic bias signals such that every signal edge of the data signals is in-phase with a signal edge of a corresponding magnetic bias signal. This method, however, is relatively involved and is difficult to carry out given some data codings.

Another method is based on the principle of extending a pulse-duration or pulse boundary of the magnetic bias signals between two signal edges of the data signals by half the period duration in order to synchronize the edges of the data signals with the corresponding edges of the magnetic bias signals. This is a relatively simple method. When, however, the frequency of the magnetic bias signals is not much higher than the frequency of the data signals, the missing signal edges of the magnetic bias signals can lead to a higher susceptibility to disturbance in the recorded signals.

It is also possible to apply a method which is based on the employment of a higher-ranking magnetic bias signal whose frequency is an uneven multiple of the maximum frequency of the data signals. The frequency of these higher-ranking magnetic bias signals is then divided by two in order to generate the magnetic bias signals. In such a method, the magnetic bias signals, however, have a DC voltage component since the sum of the pulse durations differs from the sum of the pulse pauses of the magnetic bias signals. This DC voltage component can be utilized to likewise effect a signal edge offset of the recorded signals dependent on the type of coding that is employed for generating the data signals from the digital data.

SUMMARY OF THE INVENTION

It is therefore an object of the invention to specify a method and an arrangement for generating magnetic bias signals wherein the magnetic bias signals contain no DC voltage component and wherein the signal edges of the data signals are in phase with the signal edges of the magnetic bias signals.

According to the invention, spacings between two successive signal edges of at least two of a plurality of magnetic bias signals between signal edges of the data signals are time-wise shortened such that a total of the time-wise shortenings of all spacing taken together is equal to half a period duration of the magnetic bias signals, and such that directions of signal edges of the magnetic bias signals are identical to directions of corresponding signal edges of the data signals and sums of pulse durations and pauses of the magnetic bias signals are identical. The data signals and the magnetic bias signals with the signal shortenings are overlaid and supplied to the magnetic write head for recording on the recording medium.

The method of the invention has the advantage that the signal edge shift of the recorded signals (bit-shift) is slight, and thus the recorded data can be recorded with great precision.

It is advantageous when the two successive signal edges of two magnetic bias signals are shifted within every data signal. Preferably, the locations at which the distances between the signal edges of the magnetic bias signals are shifted are uniformly distributed in the data signals.

An advantageous emodiment of the arrangement for the implementation of the method contains a control unit which, dependent on the signal edges of the data signals, generates the magnetic bias signals from clock signals generated in an oscillator. Preferably, the control unit is preceded by a signal edge detector which generates an edge signal at every signal edge of the data signals and emits the delayed data signals to the conrol unit. The control unit can contain a counter which determines the spacing between the points in time at which a shift of the signal edges of the magnetic bias signals occurs. At the beginning and end of the counting procedure, a respective phase skip of a clock signal occurs, the magnetic bias signals being acquired therefrom by means of a flip-flop. These magnetic bias signals each comprise an additional edge relative to the points in time allocated to the phase skips.

BRIEF DESCRIPTION OF THE DRAWINGS

FIG. 4 is a block circuit diagram of an arrangement for the implementation of the method of the invention;

FIG. 5 is a circuit diagram of a first embodiment of an arrangement for the implementation of the method;

DESCIRPTION OF THE PREFERRED EMBODIMENTS

Figure 1:
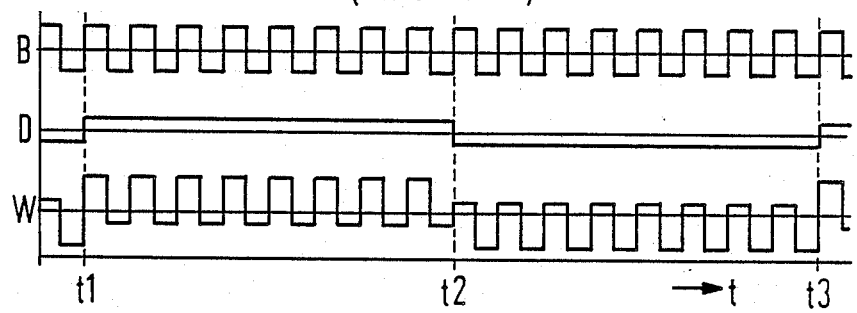
FIG. 1 illustrates a time diagram of data signals and magnetic bias signals in a first, known method.

The time diagram shown in FIG. 1 shows binary, high-frequency magnetic bias signals B which are formed of pulses having pulse durations and pulse pauses. The magnetic bias signals B are synchronized with coded, binary data signals D which exhibit signal edges at points in time t1, t2, and t3. The magnetic bias signals B and the data signals D are overlaid in order to generate write signals W which are supplied to a magnetic write head in order to record digital data on a magnetic recording medium, for example, on a magnetic tape.

As may be derived from FIG. 1, the magnetic bias signals B and the data signals D are in-phase with one another at points in time t1 and t3, i.e. the signal edges of the data signals D and the corresponding signal edges of the magnetic bias signals B occur at the same point in time and have the same direction; by contrast, the magnetic bias signal B and the data signal D exhibit mutually opposite phases at point in time t2, i.e. the signal edges in fact occur at the same point in time, but have directions opposite to one another.

When the magnetic bias signals B and the data signals D are in-phase, a slight signal edge shift (bit shift) of the recorded signals occurs, i.e. a shift of the position of the signal edges of the magnetization on the recording medium which is dependent on the coded data is slight; in contrast thereto, a noticeable signal offset can occur when the magnetic bias signals B and the data signals D exhibit opposite phases. Thus, given the write signal W at point in time t2, a resultant signal edge occurs which comprises a step, and thus the resulting signal edge region on the magnetic recording medium is imprecise, so that a noticeable signal edge offset can occur at both sides of the signal edge, dependent on the patterns of the data signals D.

Figure 2:
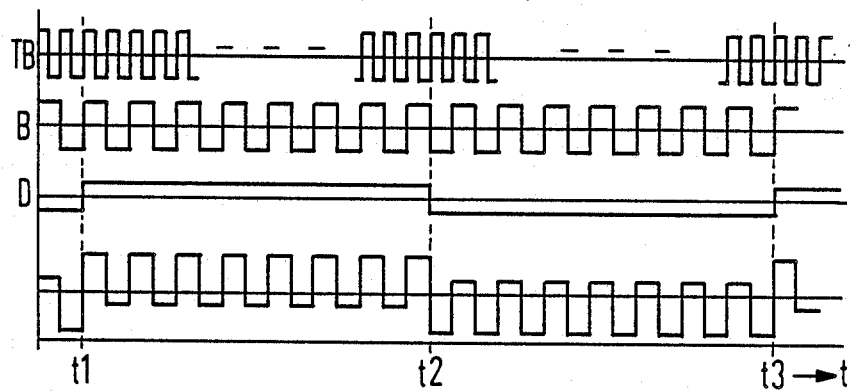
FIG. 2 shows time diagrams of data signals and magnetic bias signals in a second, known method.

Given the time diagram of a further, known method shown in FIG. 2, the magnetic bias signals B for the data signals D are generated by use of higher-ranking magnetic bias signals TB whose frequency is an uneven multiple of the highest occurring frequency of the data signals D. The repetition rate of the higher-ranking magnetic bias signals TB is divided by two in order to generate the magnetic bias signals B. In terms of phase, these are synchronized with the data signals D at points in time t1 through t3. The magnetic bias signals B and the data signals D are again overlaid on one another, so that the write signal W is generated. The plurality of pulse durations of the magnetic bias signals B between two signal edges of the data signal edges D differs from the plurality of pulse pauses, so that additional DC voltage components in the write signals W are generated by these magnetic bias signals. These additional DC voltage components can likewise produce a signal edge offset dependent on the patterns of the data signals to be recorded.

Figure 3:
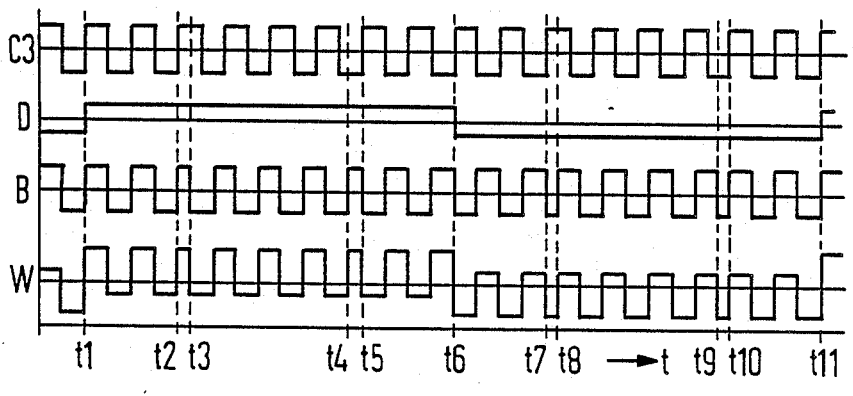
FIG. 3 illustrates time diagrams of data signals and magnetic bias signals in a method of the invention.

The time diagram shown in FIG. 3 shows magnetic bias signals B which are generated such that their signal edges are always in phase with the signal edges of the data signals D. The magnetic bias signals B and the data signals D between the points in time t1 and t2 correspond to the corresponding signals in FIG. 1, whereby the signal C3 in FIG. 3 corresponds to the signals B in FIG. 1. The pulse duration, i.e. the spacing between the signal edges of the clock signals C3, is shortened to half between the points in time t2 and t3, in contrast whereto the pulse pauses are retained. Between points in time t4 and t5, the distance between the signal edges of the clock signals C3 is again shortened by half, so that the magnetic bias signal B at point in time t6 is phase-shifted by 180° relative to the corresponding clock signal C3, and thus the signal edge of the magnetic bias signal B at point in time t6 is in-phase with the signal edge of the data signal D. Corresponding procedures are carried out between points in time t7 and t8 as well as t9 and t10, whereby the pulse pause at two locations of the magnetic bias signals B between the signal edges of the data signals D is shortened. Thus, the magnetic bias signal B and the data signal D are again in-phase at point in time t11.

Given the exemplary embodiment of the method of the invention shown in FIG. 3, the spacings between two successive signal edges were respectively shortened by half between two signal edges of the data signals D. They are thus shortened at two locations. Given a shortening at n locations by the respective n part of the pulse duration or pulse pause, a phase-oriented synchronization between the magnetic bias signals B and the data signals D is likewise achieved. For example, four spacings could also be respectively shortened by one-fourth of the normal pulse duration.

The block circuit diagram of FIG. 4 shows an arrangement for generating the magnetic bias signals B and the write signals W, as shown in FIG. 3.

An oscillator OS generates clock pulses C and C1 through C3 which are supplied to a data source DS which generates the data signals D, to an edge detector T, and to a control unit BC. The data signals D are supplied via a first amplifier A1 to a summing circuit S which generates the write signals W following the addition of the magnetic bias signals B which are supplied to the summing circuit S via a second amplifier A2. The write signals W are supplied to a magnetic write head via a write amplifier (not shown).

The data signals D are also supplied to the edge detector T which is connected to the control unit BC and which identifies the signal edges of the data signals D in order to control the generation of the magnetic bias signals B of the control unit BC on the basis of signals S1 and S4.

Figure 6:
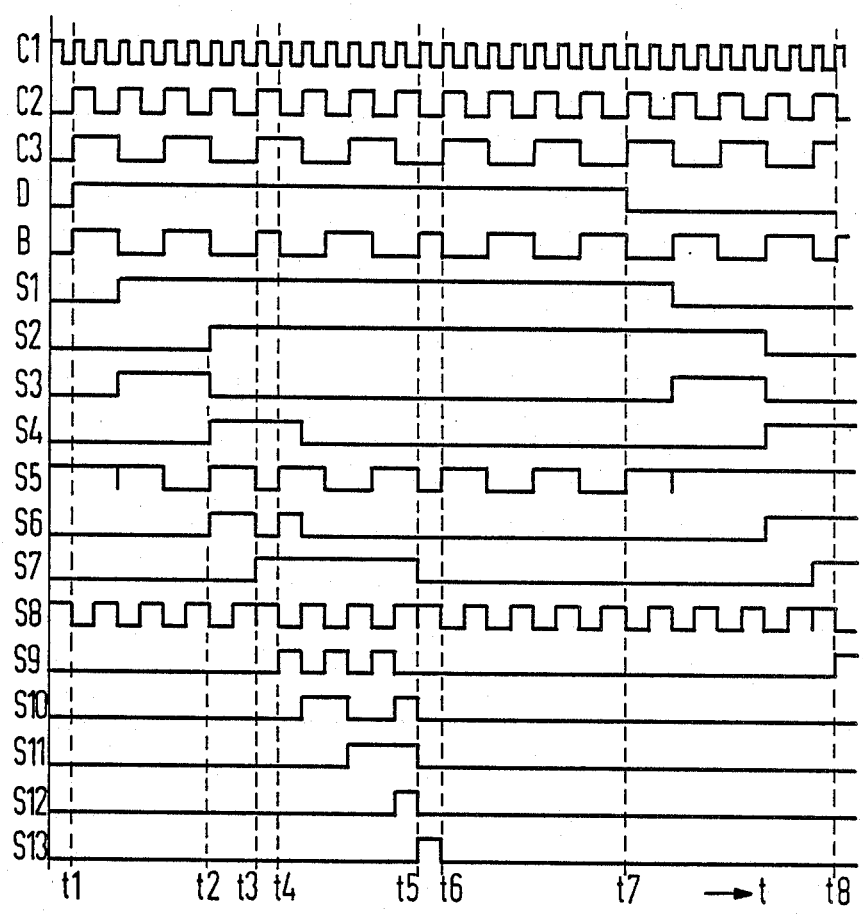
FIG. 6 is a time diagram of signals at various points of the first embodiment of the arrangement for the implementation of the method.

The circuit diagram shown in FIG. 5 shows the edge detector T, the control unit BC, and the oscillator OS, and FIG. 6 shows the signals at various points of these component parts.

By use of a clock pulse generator CG and flip-flops F1 and F2, the oscillator OS generates the clock pulses C1 through C3 and, following a further frequency division (not shown), also generates the clock signals C supplied to the data source DS. The clock pulses C1 are high-frequency clock pulses and their repetition rate is divided by two twice by the flip-flops F1 and F2 in order to generate the clock pulse C2 and C3.

The edge detector T receives the data signals D and generates delayed data signals S1 and S2 on the basis of two flip-flops F3 and F4, and generates an edge pulse S3 after every signal edge of the data signals D. It generates this by means of an EXOR gate G1, this edge pulse S3 being transferred or accepted by the clock signals C3 on the basis of a flip-flop F5 in order to generate an edge signal S4. The magnetic bias signals B normally correspond to the clock signals C3 and are generated from the clock signals T2 which are supplied to an inverting output of a flip-flop F6 via an EXOR Gate G2, the clock pulses C1 being present at the clock input of this flip-flop F6.

When, following point in time t1 in FIG. 6 at which the data signal D changes its binary value, the edge signal S4 is generated at point in time t2, and an AND gate G4 generates a signal S6 by use of a signal S5 output by a NAND gate G3. This signal S6 sets a flip-flop F7 at point in time t3. A signal S7 at the output of this flip-flop F7 is supplied, first, to an input of the EXOR element G2 and the pulse of the magnetic bias signal B is ended at point in time t4 since the phase of the clock signal C2 was changed due to the signal S7 in the EXOR element G2, as may be seen from the signal S8. The pulse duration of the magnetic bias signal B is thus shortened between points in time t3 and t4.

The signal S7 also enables a counter C which counts the clock signals C1. When the counter reaches a counter reading 6, signals S10 and S11 generate a signal S12 by means of an AND element G5, this signal S12 setting a flip-flop F8. A signal S13 at the output of the flip-flop F8 resets the flip-flop F7, so that the signal S7 changes its binary value and the phase of the clock signal C2 is again changed at point in time t5 on the basis of the EXOR element G2. The pulse duration of the magnetic bias signal B is therefore ended again at point in time t6.

Due to the modification of the pulse durations of the magnetic bias signals B between the points in time t3 and t4, or t5 and t6, the phase of the magnetic bias signal B at point in time t7 is opposite that of the magnetic bias signal B at point in time t1. Thus, the signal edges of the magnetic bias signals B at points in time t1 and t7 have the same directions as the signal edges of the data signals D.

A procedure similar to that between points in time t1 and t4 is repeated between points in time t7 and t8; however, since the data signal D has the opposite binary value, it is not the pulse duration but the pulse pause that is shortened.

Figure 7:
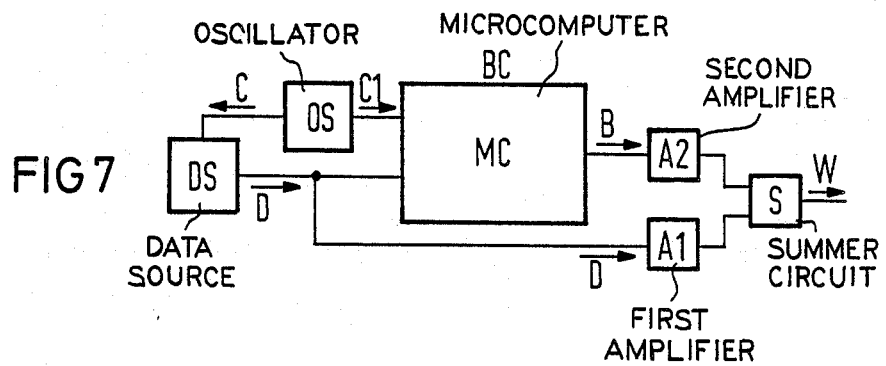
FIG. 7 is a block circuit diagram of a second embodiment of an arrangement for the implementation of the method.

The block circuit diagram shown in FIG. 7 shows a further embodiment of the invention for generating the phase-synchronized magnetic bias signals B, this employing a micro-computer MC. An oscillator OS generates clock pulses C and C1 and supplies these to the data source DS or to the microcomputer MC. The data signals D are supplied first to the summer circuit S via the first amplifier A1, and second to the microcomputer MC which, by use of a corresponding program, generates the magnetic signals B. These magnetic bias signals B are supplied to the summer circuit S via the second amplifier A2. This summer circuit S generates the write signals W by addition of the data signals D and the magnetic bias signals B. By use of the microcomputer MC, the magnetic bias signals B can be optimized for certain data patterns.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for recording digital data on a magnetic recording medium by use of binary data signals, which represent the digital data, and magnetic bias signals whose period durations are significantly shorter than a shortest period duration of the data signals, comprising steps of:
    synchronizing the magnetic bias signals and the data signals such that signal edges of the data signals occur simultaneously with signal edges of the magnetic bias signals;
    shortening time-wise spacings between two successive signal edges for at least two of a plurality of the magnetic bias signals occurring between and spaced from successive signal edges of the data signals so that a total amount of time-wise shortenings of all spacings taken together is equal to half a period duration of the magnetic bias signals, such that directions of signal edges of the magnetic bias signals are identical to directions of corresponding signal edges of the data signals, and such that sums of pulse durations and pulse pauses of the magnetic bias signals are identical; and
    overlaying the data signals and the magnetic bias signals with the time-wise shortenings, and supplying them to a magnetic write head for recording on the recording medium.

2. A method according to claim 1 wherein first binary value pulse durations of the magnetic bias signals between two successive signal edges of the data signals also having a first binary value are shortened.

3. A method according to claim 2 wherein second binary value pulse pauses of the magnetic bias signals between two successive signal edges of the data signals are shortened.

4. A method according to claim 1 wherein given shortening of time-wise spacings between two successive edges of n magnetic bias signals, every spacing is shortened by an $n^{th}$ part of half said period duration of the magnetic bias signals.

5. A method according to claim 1 wherein given shortening of time-wise spacings between two successive signal edges of two magnetic bias signals, every spacing is shortened by half of a half of said period duration of the magnetic bias signals.

6. A method according to claim 1 wherein the bias signals with shortened spacings between signal edges are substantially uniformly distributed within the data signals.

7. A method for recording digital data on a magnetic recording medium by use of binary data signals which represent digital data, and magnetic bias signals whose period durations are significantly shorter than a shortest period duration of the data signals, comprising steps of:
    synchronizing the magnetic bias signals and the data signals such that signal edges of the data signals occur simultaneously with signal edges of the magnetic bias signals;
    shortening time-wise spacings between two successive signal edges of at least two of a plurality of the magnetic bias signals between two successive signal edges of the data signals, the spacings being shortened by an amount sufficient such that directions of signal edges of the magnetic bias signals are identical to directions of corresponding signal edges of the data signals;
    all of the magnetic bias signals with time-wise spacing shortenings being spaced from one another by bias signals without time-wise spacing shortening and being distributed throughout the bias signals; and combining the data signals and the magnetic bias signals with the time-wise shortenings and supplying them to a magnetic write head for recording on the recording medium.

8. A method according to claim 7 wherein a total time of the shortened time-wise spacings between the two successive signal edges of the data signals is equal to one-half of a period duration of the magnetic bias signals.

9. A method according to claim 7 wherein for magnetic bias signals occurring when the data signals are at a first logic level, two pulse durations are halved, and when the data signals are at a second logic level following the first logic level, two of the magnetic bias signals have their pulse pauses halved.

10. A system for recording digital data on a magnetic recording medium by use of binary data signals, which represent digital data, and magnetic bias signals whose period durations are significantly shorter than a shortest period duration of the data signals, comprising:

means for synchronizing the magnetic bias signals and the data signals such that signal edges of the data signals occur simultaneously with signal edges of the magnetic bias signals;

means for shortening time-wise spacings between two successive signal edges for at least two of a plurality of the magnetic bias signals occurring between and delayed with respect to signal edges of the data signals so that a total amount of time-wise shortenings of all spacings taken together is equal to half a period duration of the magnetic bias signals, such that directions of signal edges of the magnetic bias signals are identical to directions of corresponding signal edges of the data signals, and such that sums of pulse durations and pulse pauses of the magnetic bias signals are identical; and means for overlaying the data signals and magnetic bias signals with the time-wise shortenings, and supplying them to a magnetic write head for recording on the recording medium.

11. A system according to claim 10 wherein a data source means is provided for creating the data signals; a clock generator means creates clock signals allocated to the magnetic bias signals; the data signals and the magnetic bias signals being supplied to the magnetic write head via a summer circuit; and control means connected to receive the data signals and the clock signals for providing the shortened chronological spacings between the two successive signal edges of the magnetic bias signals by said overall amount equal to half the period duration of the magnetic bias signals.

12. A system according to claim 11 wherein said control means is connected following as edge generator means for delaying the data signals and for generating an edge signal at every signal edge of the delayed data signals; and said control means shortening the chronological spacings between two successive signal edges of the magnetic bias signals during a respective duration of said edge signal and after a prescribed time duration.

13. A system according to claim 12 wherein said control means has a counter means for determining said prescribed time duration by counting clock signals.

14. A system according to claim 12 wherein said control means has an equivalence element means for modifying a phase of clock signals by 180° at a beginning and at an end of said prescribed time duration; and said equivalence element means being connected to a following flip-flop means whose control inputs are connected to an output of the equivalence element means and which outputs the magnetic bias signals at an output thereof.

15. A system for recording digital data on a magnetic recording medium by use of binary data signals which represent digital data, and magnetic bias signals whose period durations are significantly shorter than a shortest period duration of the data signals, comprising:

means for synchronizing the magnetic bias signals and the data signals such that signal edges of the data signals occur simultaneously with signal edges of the magnetic bias signals;

means for shortening time-wise spacings between two successive signal edges of at least two of a plurality of the magnetic bias signals between two successive signal edges of the data signals, the spacings being shortened by an amount sufficient such that directions of signal edges of the magnetic bias signals are identical to directions of corresponding signal edges of the data signals, and all of the bias signals with time-wise spacing shortenings being spaced from one another by bias signals without time-wise spacing shortenings and being distributed throughout the bias signals; and means for combining the data signals and the magnetic bias signals with the time-wise shortenings and supplying them to a magnetic write head for recording on the recording medium.

16. A system according to claim 15 wherein all of the bias signals with time-wise spacing shortenings are substantially uniformly distributed throughout the bias signals.

* * * * *